US012776534B2

(12) United States Patent
Wuchner et al.

(10) Patent No.: US 12,776,534 B2
(45) Date of Patent: Oct. 27, 2026

(54) BATTERY ASSEMBLY

(71) Applicant: Dr. Ing. h.c. F. Porsche Aktiengesellschaft, Stuttgart (DE)

(72) Inventors: Markus Wuchner, Stuttgart (DE); Thomas Warbeck, Lauffen am Neckar (DE); Tim Schmidt, Freiberg am Neckar (DE); Manuel Groß, Hessigheim (DE); Björn Pehnert, Tamm (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 700 days.

(21) Appl. No.: 18/144,293

(22) Filed: May 8, 2023

(65) Prior Publication Data

US 2023/0361387 A1 Nov. 9, 2023

(30) Foreign Application Priority Data

May 9, 2022 (DE) ..................... 10 2022 111 473.2

(51) Int. Cl.
*H01M 10/6569* (2014.01)
*H01M 10/613* (2014.01)
*H01M 10/625* (2014.01)
*H01M 10/6556* (2014.01)

(52) U.S. Cl.
CPC ..... *H01M 10/6569* (2015.04); *H01M 10/613* (2015.04); *H01M 10/625* (2015.04); *H01M 10/6556* (2015.04); *H01M 2220/20* (2013.01)

(58) Field of Classification Search
None
See application file for complete search history.

(56) References Cited

U.S. PATENT DOCUMENTS

| | | | | |
|---|---|---|---|---|
| 10,998,590 | B2 | 5/2021 | Harris et al. | |
| 2015/0280295 | A1* | 10/2015 | Bhunia | F28D 15/046 429/50 |
| 2018/0034116 | A1* | 2/2018 | Tajima | H01M 10/6569 |
| 2021/0159556 | A1* | 5/2021 | Jeong | H01M 10/6557 |
| 2022/0407148 | A1* | 12/2022 | Yen | H01M 10/6557 |

* cited by examiner

*Primary Examiner* — Carlos Barcena
(74) *Attorney, Agent, or Firm* — Buchanan Ingersoll & Rooney PC

(57) ABSTRACT

A battery assembly includes at least one battery module having a battery module housing defining a battery module interior, in which at least one battery cell and a refrigerant are arranged. At least one capillary assembly is arranged so as to externally abut against at least one of the at least one battery cells in such a way that it inclines obliquely starting from a first end of the battery cell towards a second end of the battery cell. The capillary assembly is configured so as to receive liquid refrigerant from a refrigerant supply arranged at the first end of the battery cell and release gaseous refrigerant into the battery module interior at least at the second end of the battery cell.

15 Claims, 3 Drawing Sheets

BATTERY ASSEMBLY

CROSS-REFERENCE TO RELATED APPLICATION

This application claims priority to German Patent Application No. 10 2022 111 473.2, filed May 9, 2022, the content of such application being incorporated by reference herein in its entirety.

FIELD OF THE INVENTION

The invention relates to a battery assembly, in particular with a cooling device, and to a motor vehicle having such a battery assembly.

BACKGROUND OF THE INVENTION

Electrochemical energy storage devices, hereinafter referred to as batteries, can perform differently at different temperatures, i.e. in particular the derivable amount of energy per unit of time and also the absolute derivable amount of energy can depend greatly on the temperature of the battery.

In particular, the battery provided for supplying power to the drive motor of electric or hybrid vehicles must on the one hand store a large amount of energy in order to enable a long range, while on the other hand it must be able to produce large power outputs in order to meet the power requirement of the engine. In addition, it must be able to be charged with sufficiently large power in order to allow for rapid reuse after rundown.

Accordingly, during the rundown and charging, high currents occur, which can lead to a significant temperature increase on the inevitable internal resistances or in the chemical reaction underlying the charging and rundown. On the one hand, this temperature increase can have a strong impact on the charging or rundown characteristic as well as the life of the battery, while on the other hand, too great a temperature increase can lead to damage to the battery or thermally coupled components, up to a tripping of protective apparatuses or even an uncontrolled exothermic reaction, which ultimately makes the use of the battery and any apparatus supplied therefrom impossible.

High-performance batteries typically include a plurality of battery cells that are connected serially and/or in parallel in order to provide a required nominal voltage and nominal current. The battery cells are typically arranged in a housing, which provides protection against mechanical damage and can also accommodate sensors and associated electronic circuitry. In addition, the housing can be configured so as to heat and/or cool the battery in order to set an optimal temperature for charging or running down the battery. The housing is also referred to hereinafter as a battery module.

Battery cells can be present, among other things, as round cells with a solid cylindrical housing, prismatic cells with a cuboid solid housing, or as so-called pouch cells, i.e. flat cells without a solid housing. Cells with their own solid housing offer advantages in handling when designing and manufacturing battery modules. In addition, the mechanical requirements for the housing are smaller than for pouch cells. In addition, cells with a fixed, separate housing are available in a plurality of variants from a large number of manufacturers, so that even smaller series of battery modules can be manufactured inexpensively.

The cooling of battery cells is often implemented via cooling plates or by circulating a fluid around the battery cells that is cooled in a radiator and redirected to the battery cells in a circuit. In particular, the circulating of liquid fluid around the battery cells is costly in terms of construction, among other things because the battery modules must be connected to a cooling circuit in a fluid-tight manner. When circling a gaseous fluid, for example air cooling, outside air must be directed through a filter that filters out at least coarse dirt and dust out of the air. The cooling with cooling plates requires a permanently good thermal contact between the battery cells and the respective cooling plate, which entails additional effort in manufacturing of the battery modules.

It is therefore desirable to provide a cooling for battery cells of a battery module that occurs within a battery module in a closed loop circuit, while still providing a high cooling capacity for the individual battery cells.

SUMMARY OF THE INVENTION

A battery assembly comprises at least one battery module. The at least one battery module comprises a battery module housing defining a battery module interior, in which at least one battery cell and a refrigerant are arranged. According to the present invention, at least one capillary assembly is arranged so as to externally abut against at least one of the at least one battery cells, wherein the properties of said capillary assembly influencing the strength of the capillary effect vary between a first and a second end of the at least one battery cell along the rise height of the refrigerant rising in the capillary assembly.

The properties of the capillary structure influencing the strength of the capillary effect include, among other things, the capillary radius, i.e. the width of a capillary available for the transport of fluid, the porosity within the capillary structure, the wetting properties of the capillary walls, the spatial orientation of the capillaries in relation to the respective battery cell, and the gravity in an installation position, etc.

For example, the rise height can be considered a distance from a supply of refrigerant arranged at one end of the battery cell.

The variable properties influencing the strength of the capillary effect can advantageously be adjusted so as to optimally exploit the ratio between capillary force and the pressure drop dependent on the rise height. Thus, for example, the capillaries at a lower end with respect to gravity can have a larger capillary radius that decreases with increasing distance from the lower end. Alternatively or additionally, the porosity of the capillary assembly in relation to gravitational force can be greater at the lower end than at a further distance therefrom.

The variable properties influencing the strength of the capillary effect can vary continuously, or incrementally, or incrementally with continuous transitions. In a continuous variation, it can run linearly over the distance between the two ends of the battery cell or can also run non-linearly.

With uneven temperature profiles between the ends of the battery cell, as are known for one battery cell type, the capillary structure can also be adjusted in regions where higher temperatures frequently occur in such a way that a greater volume flow of the refrigerant per unit of time occurs there and/or a leakage of vaporized refrigerant is simplified, e.g. by a greater porosity than in other regions.

In one or more configurations, the variation of the properties influencing the strength of the capillary effect is dynamically dependent on the temperature. This dynamic dependence can be achieved, for example, by coupling the capillary structure to a variation structure made from a material having a high thermal expansion coefficient. The variation structure exerts for example a tensile force or a compression force via a suitable coupling on the capillary structure or parts thereof, such that, for example, the capillary radii are changed by the tension or the pressure as a function of the temperature.

The capillary assembly can be arranged on the respective battery cell such that it rises straight or obliquely from a first end of the battery cell towards a second end of the battery cell. An obliquely rising or spiral attachment of the capillary assembly to the individual battery cells advantageously allows the material of the capillary structure, which is present in an elongated form, to be arranged with distances between the lateral regions that can be adjusted as desired. In addition, a structure wound around an object has an inherent grip on the object, which facilitates assembly of the individual battery cells in the battery module. As can be seen in FIGS. 1 to 3, the capillary structures of adjacent battery cells can be arranged with respect to one another such that they do not contact. On the one hand, in doing so, the distance between the battery cells can be kept low, and, on the other hand, refrigerant from the capillary structure of a battery cell can also be heated by the surface of an adjacent battery cell at individual points or in individual regions.

The capillary assembly or one or more configurations thereof is configured so as to receive liquid refrigerant from a refrigerant supply arranged at the first end of the battery cell and release gaseous refrigerant into the battery module interior at least at the second end of the battery cell.

The capillary assembly abutting the battery cell externally is in thermal contact with the battery cell so that liquid refrigerant rising from the capillary effect in the capillary assembly is heated by the battery and finally transitions into a gaseous state. The gaseous refrigerant can exit from the capillary assembly into the battery module interior at least at the second end of the battery cell, but it is also possible that it can already enter the battery module interior from the capillary assembly.

In one or more configurations, the at least one capillary assembly has a greater length than width. Lateral regions of the at least one capillary assembly extending along the length of the capillary assembly do not touch one another, so that there remains a clearance laterally adjacent to the at least one capillary assembly. Due to this clearance, condensed liquid refrigerant can flow back along the at least one battery cell to the refrigerant supply.

In one or more configurations, two or more capillary assemblies are arranged on the at least one battery cell, whose lateral regions do not contact. As a result, the refrigerant evaporated after absorbing the heat energy can quickly escape from the capillary assembly and the region of the battery cells, thereby also increasing the capillary effect of the capillary assemblies, because the capillary effect acts primarily in the liquid state of the refrigerant.

The at least one capillary assembly can be guided around the periphery of the battery cell once or several times so that a spiral assembly results, although a capillary assembly extending over only a part of the periphery of the battery cell is also conceivable. When two or more capillary assemblies are arranged on a battery cell, they can run parallel to one another without touching, similar to a folded double spiral staircase.

In one or more configurations, at least one fluid passage is formed between the battery cells and the battery module housing, via which the battery module interior is fluidly connected between the first wall and the second wall, such that a flow of refrigerant is enabled. In particular, the refrigerant condensed on a cooling element arranged above can thereby easily travel from the upper to the lower region and is again available for transport through the capillary assemblies and for evaporation. The at least one fluid channel can be formed between the non-contacting lateral regions of the capillary assemblies or through another clearance inside the battery module housing.

In one or more configurations, a cavity is provided at least in regions between the battery cells and the first wall, which cavity allows for an accumulation of liquid refrigerant and the formation of a refrigerant sump. On the one hand, a good cooling is thus also possible in the lower region, and on the other hand, the refrigerant can be received by the capillary assemblies reaching into the refrigerant sump.

In one or more configurations, at least one cooling element is provided, which is arranged in a first and/or a second wall of the battery module housing or is thermally conductively connected to an exterior of a first and/or a second wall of the battery module housing. The cooling element is configured so as to cool the first and/or second wall at least in sections in order to allow a condensation of the refrigerant. The first wall and/or second wall can thereby act as effective condensation surfaces. If only one cooling element is provided, it is preferably arranged in the second wall above the battery cells, wherein "above" is understood to mean in an installation position of the battery module housing relative to gravity. The cooling of the second wall is advantageous, because the evaporated refrigerant is carried upwards by the lower density and falls down after condensation. In so doing, battery cells can be cooled directly in the upper region, for example when the condensed refrigerant reaches the top of a battery cell, but also in the lower region when the refrigerant reaches the lower end of a battery cell.

In one or more configurations, at least the second wall is spaced apart from the second end of the at least one battery cell, such that there is no direct connection between the capillary assembly and the second wall. Gaseous refrigerant exiting the capillary assembly can freely rise in the direction of the second wall in order to condense there.

In one or more configurations, the surface of the second wall facing the battery module interior is structured such that condensed refrigerant is guided to a position above a second end of a battery cell before it is detached from the surface of the second wall facing the battery module interior due to gravity. As a result, at least portions of the refrigerant fall onto the second end of the battery cells so that they at least partially equally re-evaporate on the hot surface of the battery cells, thus increasing the cooling effect.

In one or more configurations, a temperature profile can be set along the cooling element on or in the second wall, for example by means of correspondingly laid coolant tubes, correspondingly set material thicknesses, or the like, such that a respective local temperature minimum is present for a given battery cell.

In one or more configurations, the material of the capillary assembly is configured at least in regions so as to be open-pored or open-porous. The open-pored or open-porous configuration allows a good transport of the refrigerant within the capillary assembly and, if necessary, a transition of the refrigerant into the battery module interior or the space between adjacent lateral regions of capillary assemblies.

For example, open-porous metal foams can be produced by melt infiltration of placeholder structures. The placeholder structures are removed from the foam structure upon solidification of the molten metal. For example, salt granules, polymer placeholders, or sand granules are used as the placeholder structures. Alternatively, the metal foams can be generated by a sintering operation.

In one or more configurations, the material of the capillary assembly comprises metal foam. Metal foam is easily industrially produced and allows for good capillary transport. The metal foam can in particular contain nickel, copper, or iron, in particular stainless steel. These materials allow a stable structure and a good production of the metal foam.

Metal foam has small structures and thus a good capillary effect. The structures can have widths, for example, in the range of 10 nm to only a few mm. However, microporous structures with a width of less than 2 nm are also possible. The metal structures mentioned above have the advantage that they are comparatively stable and that good heat conduction is possible through the metal. The stability is advantageous, for example, when the battery cells 36 are pressed against one another, as is common in the case of pouch battery cells, for example.

In one or more configurations, the metal foam is configured as an anisotropic metal foam with pores, which have a higher extension in at least some regions in at least a first direction, e.g. parallel to the battery cells, than in a second direction, e.g. perpendicular to the surface of the battery cells. This allows the refrigerant to flow well between the first wall and the second wall of the battery module housing. When the pores are correctly aligned, anisotropic metal foam allows for a higher cooling efficiency through a greater mass flow of the refrigerant over the same design space.

Metal foams have a good capillary effect and can be used, for example, for pouch, round, or prismatic battery cells. However, instead of metal foam, metal wool can also be used. Metal wool is used in a variety of manners in technology. It also has a good capillary structure and allows for a high cooling efficiency by conveying the refrigerant between the battery cells. Metal wool can be used, for example, for pouch, round, or prismatic battery cells, and, due to its good deformability, it can also be adapted to irregularly shaped or curved surfaces, such as those present in the case of flat or standing round battery cells.

In one or more configurations, the material of the capillary assembly comprises titanium sponge. Titanium sponge is a structure comprising titanium or a titanium alloy. While titanium is a comparatively expensive material, it is comparatively cheaply available as a titanium sponge powder as a waste product of different manufacturing processes. In addition, titanium is relatively light with high strength. Accordingly, according to one embodiment, the titanium sponge is sintered from titanium sponge powder, resulting in an advantageous porous structure. Like anisotropic metal foam, titanium sponge allows a large mass flow of the refrigerant. Titanium sponge can be used, for example, for pouch, round, or prismatic battery cells.

In one or more configurations, the absolute pressure in the battery module housing is lower than 1.0 bar at 20° C. in order to decrease the evaporation temperature of the refrigerant compared to an absolute pressure of 1.0 bar. The absolute pressure of 1.0 bar approximately corresponds to a normal pressure in the exterior region. The refrigerant works particularly effectively when switching back and forth between the liquid and gaseous states, which is favored by the low pressure. According to a preferred embodiment, the absolute pressure in the battery module housing at 20° C. is between 0.1 bar and 0.8 bar, preferably between 0.2 bar and 0.6 bar, and particularly preferably between 0.3 bar and 0.5 bar. This allows a change of the aggregate state of the refrigerant even at comparatively low temperatures.

A motor vehicle comprises such a battery assembly and an electric motor. Such a motor vehicle allows a good cooling of the battery assembly and thus a high performance and a long range.

The capillary assembly allows so-called gap fillers to be omitted, which are required in conventional battery modules for a good heat transport from the battery cells to the battery module housing.

In case of negative pressure in the battery module housing, the compression pads required for pouch cells can be omitted.

BRIEF DESCRIPTION OF THE DRAWINGS

Further details and advantageous further developments of the invention will emerge from the embodiment examples, which are described below and illustrated in the drawings and are not to be construed as limiting the invention in any way, and from the claims. It goes without saying that the features mentioned above and those yet to be discussed below can be used not only in the respectively specified combination, but also in other combinations or on their own, without leaving the scope of the present invention. The following are shown:

DETAILED DESCRIPTION OF THE INVENTION

Parts that are the same or have the same effect bear the same reference numbers in the following and are generally described only once. The descriptions of all of the figures build on one another in order to avoid unnecessary repetitions.

Figure 1:
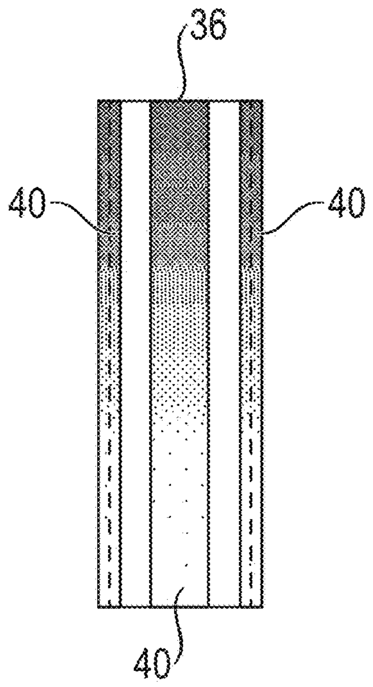
FIG. 1 is a schematic view of a first capillary structure arranged on a battery cell according to aspects of the invention.

FIG. 1 shows a schematic view of a first embodiment of a capillary structure 40 arranged on a battery cell 36 according to aspects of the invention. The battery cell 36 is only partially visible in the white areas of this illustration; the outlines of the battery cell are indicated by the dashed lines. In this embodiment, several straight elements of the capillary structure 40 are arranged around the periphery of the battery cell 36, wherein the interstices form a fluid channel along the exterior of the battery cell 36. The variable properties influencing the strength of the capillary effect are indicated in this figure and in the following figures by a graded coloration of the background and the differentiated dot density.

Figure 2:
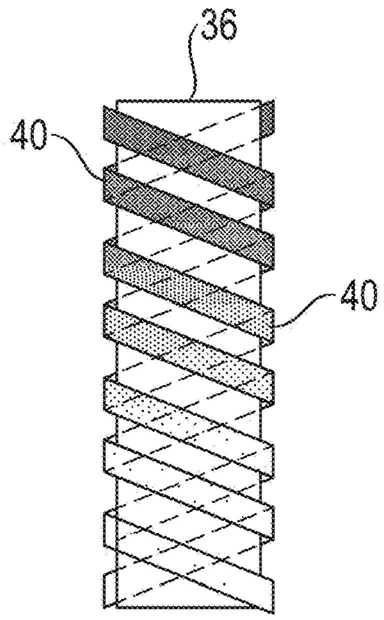
FIG. 2 is a schematic view of a second capillary structure arranged on a battery cell according to aspects of the invention.

FIG. 2 shows a schematic view of a second embodiment of a capillary structure 40 arranged on a battery cell 36 according to aspects of the invention. The outlines of the battery cell 36 are better visible in this illustration than in FIG. 1. In this embodiment, two separate elements of the capillary structure 40 are placed parallel to one another spirally around the battery cell 36 without contacting one another at any point. Again, the interstices form a fluid channel along the outside of the battery cell 36.

Figure 3:
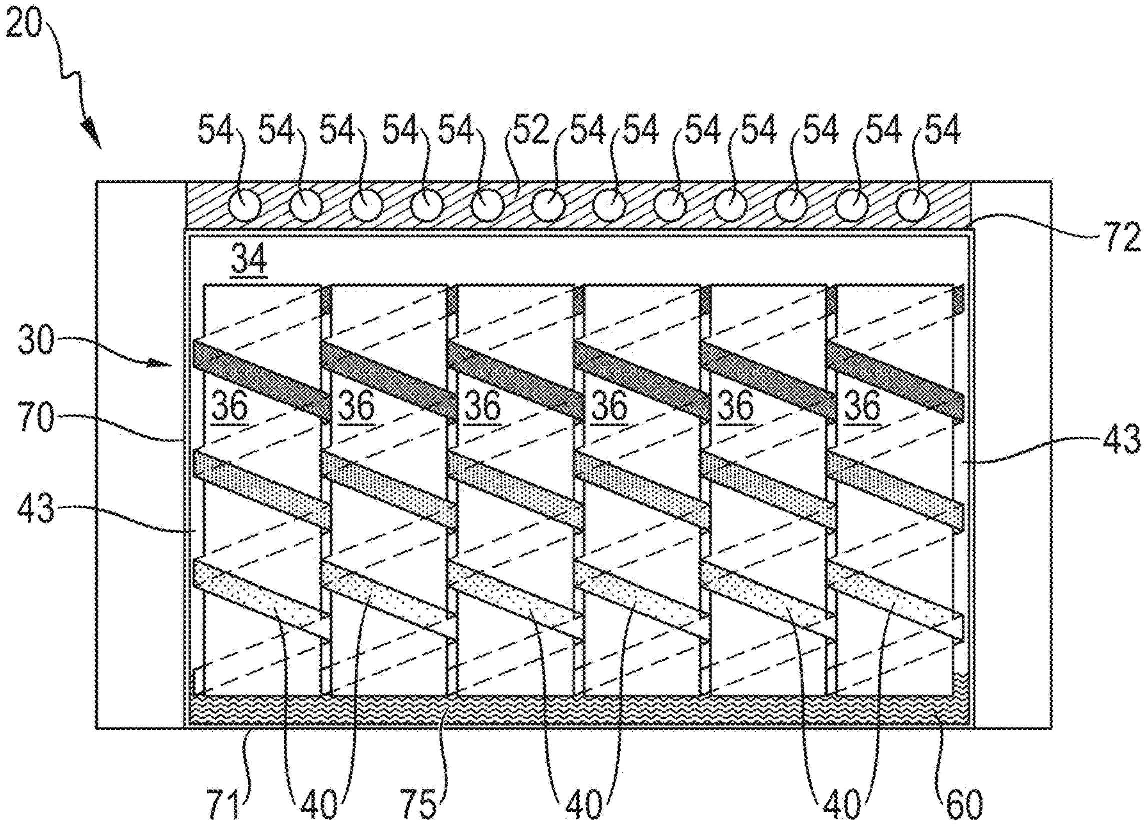
FIG. 3 depicts in a schematic view, a first exemplary battery assembly.

FIG. 3 shows a battery assembly 20 comprising at least one battery module 30 having a battery module housing 70, battery cells 36, a refrigerant 60, and capillary assemblies 40.

The battery module housing 70 defines a battery module interior 34, in which battery module interior 34 the battery cells 36, the refrigerant 60, and the capillary assemblies 40 are arranged.

The capillary assemblies 40 are arranged so as to externally abut and spirally wind around the battery cells 36 and are configured so as to receive liquid refrigerant 60 from a refrigerant supply arranged at a first, in the present case lower, end of the battery cell 36 and to release gaseous refrigerant 60 at least at a second, in the present case upper, end of the battery cell 36 into the battery module interior 34.

The battery module housing 70 comprises a first bottom wall 71 and a second top wall 72. The second wall 71 is arranged at least in sections above the battery cells 36, and the first wall 71 is arranged at least in sections below the battery cells 36.

The battery assembly 20 comprises an upper cooling element 52, which is configured so as to cool the second wall 72 at least in sections in order to allow condensation of the refrigerant 60 there. It is also possible, alternatively or additionally, to provide a cooling element 51 arranged on or in the first wall 71, or to cause a cooling directly through the battery module housing 70 in cold regions. In the embodiment example, the cooling elements 51, 52 have channels 54 through which a coolant can flow in order to dissipate the heat. The cooling elements 51, 52 are configured as cooling plates in the embodiment example.

Preferably, at least a first fluid channel 43 is formed between the battery cells 36 and the battery module housing 70, via which channel the battery module interior 34 is fluidly connected between the first wall 71 and the second wall 72. This allows a flow of refrigerant through the at least one first fluid channel 43.

A clearance remains between the lateral regions of the capillary assembly 40 arranged on a battery cell 36, which provides a further fluid channel between the first wall 71 and the second wall 72, via which the refrigerant 60 can rapidly escape the capillary assembly 40 in a gaseous state. The distances between the lateral regions of the capillary assembly 40 in the drawing can vary and are to be considered exemplary only. Also via these fluid channels, refrigerant 60 condensed on the second wall 72 can arrive back at the first wall 71, wherein, as it passes along the surface of a battery cell 36, it cools the latter at the same time.

The refrigerant 60 is thus transported upward in the liquid state by the material of the capillary assembly 40, which has capillary properties, and, after absorption of heat and the transition of the refrigerant 60 into the gaseous state, it can escape upwards or downwards via the fluid channels quickly and without great fluid resistance.

In the lower region, a cavity 75 is preferably provided at least in regions between the battery cells 36 and the first wall 71, which cavity allows for an accumulation of liquid refrigerant 60 and the formation of a refrigerant sump.

The refrigerant 60 can be both liquid and gaseous as a fluid, and by absorbing thermal energy, it can transition from a liquid to a gaseous state. As a result, a comparatively large amount of thermal energy can be absorbed and dissipated. In the embodiment example, the battery module housing 70 is cuboidally formed and comprises a left third wall, not further described in the figure, and a right fourth wall, in addition to the first wall 71 and second wall 72. Also not shown in the figure are front and rear walls of the battery module housing 70. Other basic shapes of the battery module housing 70 are possible, for example a cylindrical shape or spherical shape.

The battery module housing 70 is preferably closed so that the refrigerant 60 cannot escape from the battery module housing 70 in normal operation, or else only to a small extent. In operation, heat is generated on the battery cells 36, and the liquid refrigerant 60 can absorb and evaporate this heat. As a result, the refrigerant 60 can absorb a large amount of thermal energy. For example, the evaporated refrigerant 60 rises upward towards the second wall 72 and is cooled there. Due to the cooling, the refrigerant condenses and can flow downward through the fluid channels 43. In the lower region of the battery module housing 70, the refrigerant 60 can accumulate and form a refrigerant sump, wherein the battery cells 36 are preferably at least partially in the sump at 20° C. The at least one capillary assembly 40 arranged on at least one battery cell 36 allows an ascent of the refrigerant 60 along the exterior of the respective battery cell 36 due to the capillary effect. As a result, liquid refrigerant 60 can be provided on a large surface on the exterior of the respective battery cell 36 and absorb thermal energy there. This increases the cooling performance of the battery assembly 20.

Figure 4:
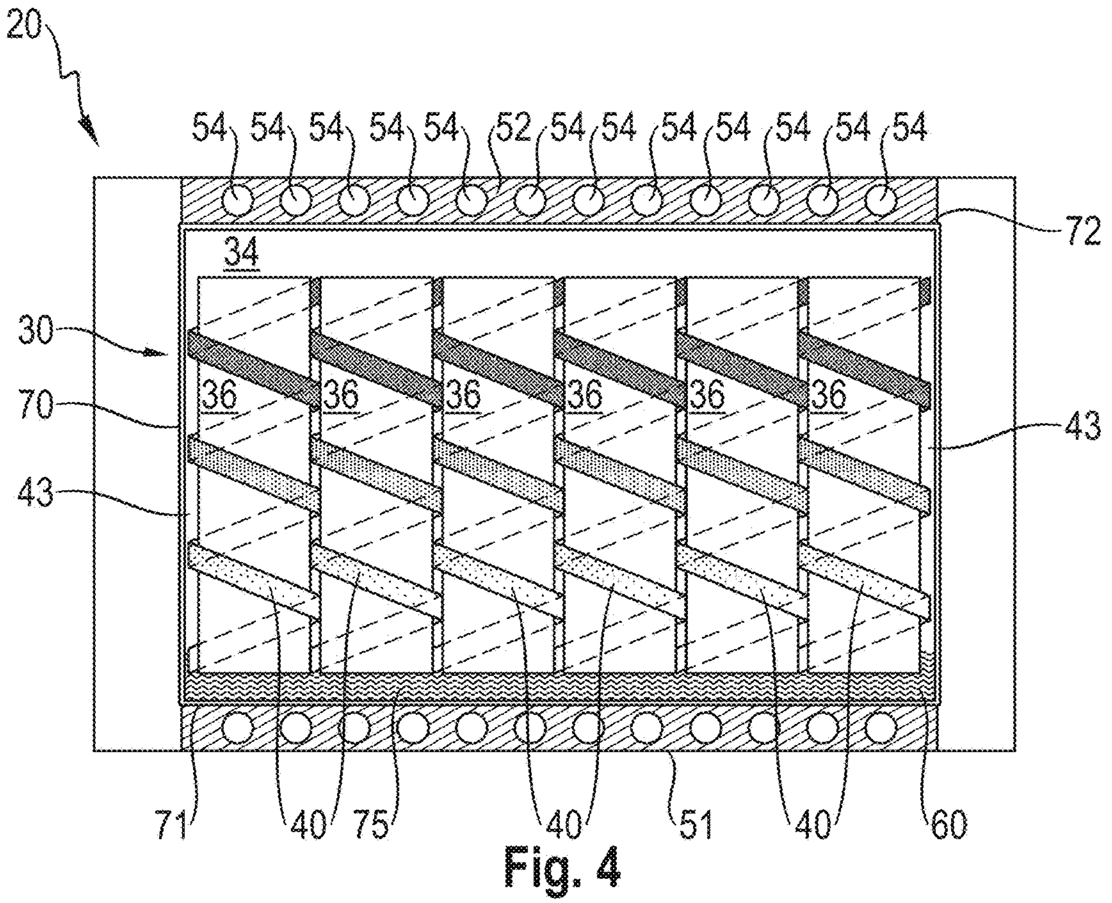
FIG. 4 depicts in a schematic view, a second exemplary battery assembly.

FIG. 4 shows a schematic view of a second exemplary battery assembly 20. The battery assembly in this figure substantially corresponds to that of FIG. 1, however, an additional cooling element 51 is arranged here at or in the first wall 71, which cools the refrigerant 60 present in the refrigerant sump. In the figure, the cooling element 51 corresponds to the cooling element 52 on or in the second wall 72; the individual elements of the cooling element 51 are therefore not designated separately.

Figure 5:
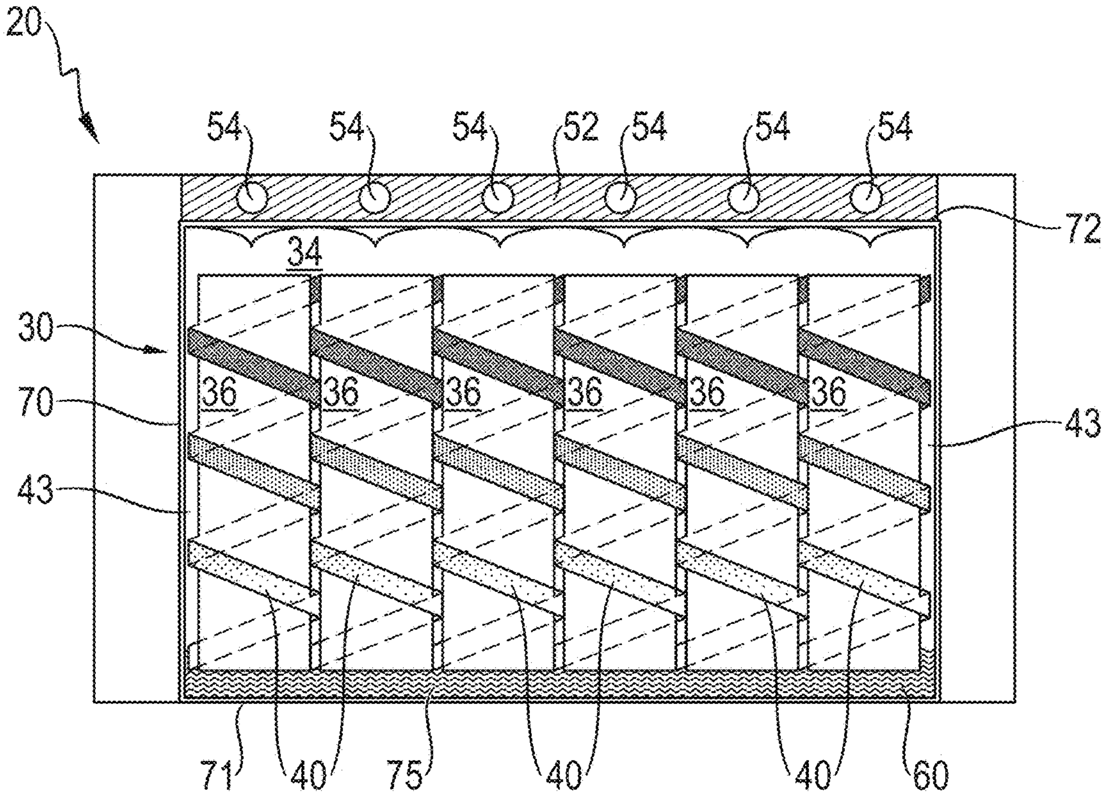
FIG. 5 depicts in a schematic view, a third exemplary battery assembly.

FIG. 5 shows a schematic view of a second exemplary battery assembly 20. The battery assembly in this figure substantially corresponds to that of FIG. 1, however, here the surface of the second wall 72 facing the battery module interior 34 is structured so that refrigerant 60 condensed thereon is guided to a position located above a second end of a battery cell 36 before it is detached from the surface of the second wall 72 facing the battery module interior 34 due to gravity and at least portions thereof fall onto the second end of the battery cells 36. The structuring can be formed, for example, by ribs. As shown in the figure, the ribs can have a pointed shape in order to improve the targeted detachment of condensate droplets. Instead of ribs, structures that taper to a tip in two dimensions can also be provided.

While in FIGS. 3 to 5 the capillary structures are arranged spirally on the outer wall of the battery cells, a straight assembly is also possible. Several straight capillary structures may be arranged in a strip-like manner along the periphery of the respective battery cell, as shown in FIG. 1, preferably spaced apart from one another such that a fluid channel remains between two adjacent capillary structures.

Figure 6:
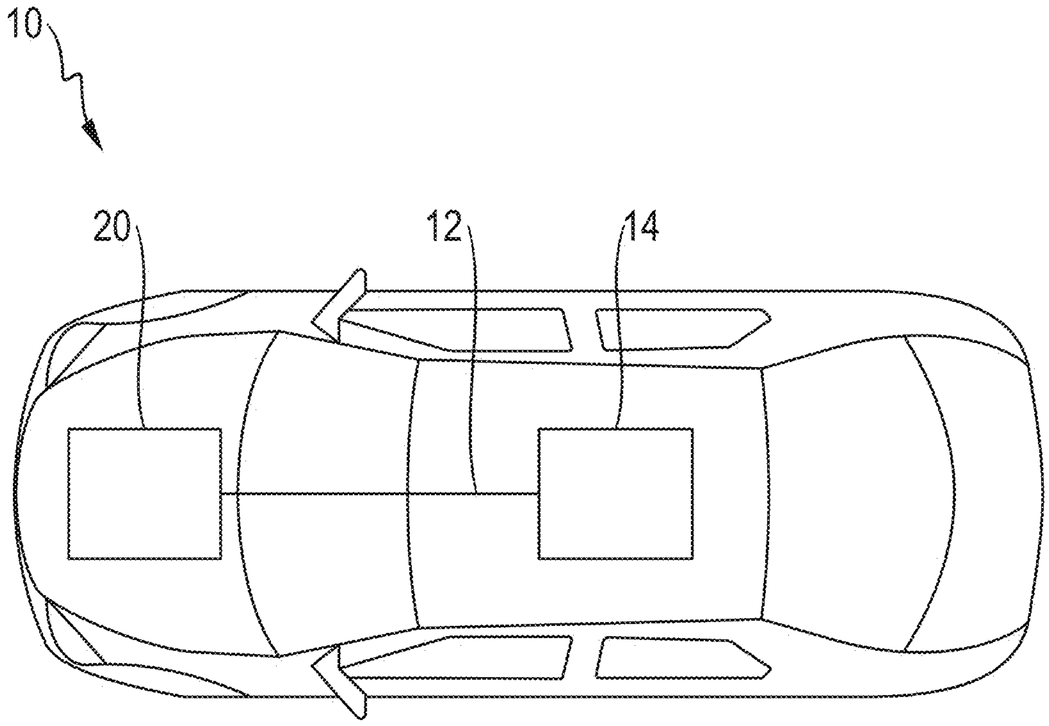
FIG. 6 depicts a motor vehicle having the battery assembly according to aspects of the invention.

FIG. 6 shows a motor vehicle 10 having such a battery assembly 20, which is schematically connected to an electric motor 14 via an electrical lead 12. In motor vehicles 10, the battery assembly 20 is particularly advantageous, because it allows a good cooling effect and thus a good range of the motor vehicle 10.

Many variants and modifications are of course possible within the scope of the present invention.

LIST OF REFERENCE NUMBERS (PART OF THE DESCRIPTION)

20 Battery assembly
30 Battery module
34 Battery module interior
36 Battery cells
40 Capillary assembly
43 Fluid channel
51, 52 Cooling element
54 Channel
60 Refrigerant
70 Battery module housing
71 First wall
72 Second wall
75 Cavity

What is claimed is:

1. A battery assembly comprising:

at least one battery module including a battery module housing defining a battery module interior, at least one battery cell and a refrigerant arranged in the battery module interior, and at least one capillary assembly arranged so as to externally abut against the at least one battery cell and extend from a first end of the at least one battery cell to a second end of the at least one battery cell, wherein properties of said capillary assembly influencing a capillary effect strength vary continuously between the first end and the second end of the at least one battery cell along a rise height of the refrigerant rising in the capillary assembly, wherein the at least one battery cell has a cylindrically shaped body, wherein the first end and the second end of the at least one battery cell are positioned at opposite sides of the cylindrically shaped body, and wherein the cylindrically shaped body is arranged upright such that the first end rests on a base surface of the battery module housing where the refrigerant collects in the battery module interior, wherein the at least one capillary assembly is wound about the cylindrically shaped body in a spiral manner.

2. The battery assembly according to claim 1, wherein the variation of the properties influencing the capillary effect strength is dynamically dependent upon temperature.

3. The battery assembly according to claim 1, wherein the capillary assembly is configured so as to receive liquid refrigerant from a refrigerant supply arranged at the first end of the battery cell and release gaseous refrigerant into the battery module interior at least at the second end of the battery cell.

4. The battery assembly according to claim 1, wherein the at least one capillary assembly has a greater length than width, and wherein lateral regions of the at least one capillary assembly extending along the length of the capillary assembly do not contact one another, such that there exists a clearance laterally adjacent to the at least one capillary assembly, through which condensed refrigerant can reach the refrigerant supply along the at least one battery cell.

5. The battery assembly according to claim 1, wherein two or more capillary assemblies are arranged on the at least one battery cell, whose lateral regions do not contact one another.

6. The battery assembly according to claim 1, further comprising at least two battery cells, wherein at least one fluid channel is formed between battery cells and the battery module housing via which the battery module interior is fluidly connected between the first wall and the second wall, such that a flow of refrigerant is enabled.

7. The battery assembly according to claim 1, further comprising at least two battery cells, wherein a cavity is disposed at least in regions between the battery cells and the first wall, which cavity allows for an accumulation of liquid refrigerant and the formation of a refrigerant sump.

8. The battery assembly according to claim 1, further comprising at least one cooling element that is either (i) arranged in a first and/or a second wall of the battery module housing or (ii) connected to an exterior of the first and/or the second wall of the battery module housing in a thermally conductive manner and configured so as to cool the first and/or second wall at least in sections, in order to allow a condensation of the refrigerant.

9. The battery assembly according to claim 8, wherein at least the second wall is arranged so as to be spaced apart from the second end of the battery cell, such that there is no direct connection between the capillary assembly and the second wall.

10. The battery assembly according to claim 9, wherein a surface of the second wall facing the battery module interior is structured so that refrigerant condensed thereon is guided to a position located above the second end of the battery cell before the condensed refrigerant detaches from the surface of the second wall facing the battery module interior due to gravity and at least portions thereof fall onto the second end of the battery cell.

11. The battery assembly according to claim 1, wherein a temperature profile is set along a cooling element located either at or in the second wall, which temperature profile has a respective local temperature minimum for each battery cell.

12. The battery assembly according to claim 1, wherein a material of the capillary assembly is formed at least in regions to be open-pored or open-porous.

13. The battery assembly according to claim 1, in which an absolute pressure in the battery module housing is lower than 1.0 bar at 20° C. in order to decrease an evaporation temperature of the refrigerant compared to an absolute pressure of 1.0 bar.

14. The battery assembly according to claim 13, in which the absolute pressure in the battery module housing at 20° C. is between 0.1 bar and 0.8 bar.

15. A motor vehicle comprising a battery assembly according to claim 1 and an electric motor.

* * * * *